United States Patent
Lee et al.

(10) Patent No.: US 10,285,207 B2
(45) Date of Patent: May 7, 2019

(54) METHOD AND APPARATUS FOR PERFORMING CALL RELAY IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR); Laeyoung Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 120 days.

(21) Appl. No.: 15/126,985

(22) PCT Filed: Mar. 30, 2015

(86) PCT No.: PCT/KR2015/003117
§ 371 (c)(1),
(2) Date: Sep. 16, 2016

(87) PCT Pub. No.: WO2015/147614
PCT Pub. Date: Oct. 1, 2015

(65) Prior Publication Data
US 2018/0035353 A1 Feb. 1, 2018

Related U.S. Application Data

(60) Provisional application No. 61/971,545, filed on Mar. 28, 2014.

(51) Int. Cl.
*H04W 76/10* (2018.01)
*H04M 3/58* (2006.01)
(Continued)

(52) U.S. Cl.
CPC ............ *H04W 76/10* (2018.02); *H04M 3/58* (2013.01); *H04W 40/22* (2013.01);
(Continued)

(58) Field of Classification Search
CPC ............ H04W 12/04; H04W 72/0406; H04W 52/0229; H04W 72/10; H04W 24/02;
(Continued)

(56) References Cited

U.S. PATENT DOCUMENTS

2009/0323581 A1 12/2009 Masuda
2012/0026865 A1 2/2012 Fan et al.
(Continued)

FOREIGN PATENT DOCUMENTS

CN 101897153 11/2010
CN 103299313 9/2013
(Continued)

OTHER PUBLICATIONS

Institute for Information Industry (III), "Performance of D2D synchronization source selection and D2DSS transmission", 3GPP TSG-RAN WG1 Meeting #76bis, R1-141498, Mar. 21, 2014, 5 Pages.
(Continued)

*Primary Examiner* — Dady Chery
(74) *Attorney, Agent, or Firm* — Lee Hong Degerman Kang Waimey (57) ABSTRACT

A method and apparatus for performing call relay in a wireless communication system is provided. A relaying user equipment (UE) configures a call order or priority among neighboring UEs, selects at least one neighboring UE among the neighboring UEs, and establishes a call or a session between the selected neighboring UE and a caller UE.

9 Claims, 9 Drawing Sheets

(51) Int. Cl.
  *H04W 40/22* (2009.01)
  *H04W 88/04* (2009.01)
  *H04W 4/16* (2009.01)
(52) U.S. Cl.
  CPC .......... *H04M 2207/18* (2013.01); *H04W 4/16* (2013.01); *H04W 88/04* (2013.01)
(58) Field of Classification Search
  CPC .......... H04W 76/023; H04W 52/0235; H04W 72/0413; H04W 72/12; H04W 72/0453; H04W 76/02; H04W 4/005; H04W 52/0209; H04W 72/04; H04W 76/00; H04W 36/0016; H04W 36/00; H04W 36/005; H04L 27/0008; H04L 5/0053; H04L 5/26; H04L 47/767; H04L 43/16; H04B 7/2121; H04B 7/2123; H04B 7/2615; H04B 7/18541; H04J 2203/0069; H04J 4/00; H04Q 2213/394
  See application file for complete search history.

(56) References Cited

U.S. PATENT DOCUMENTS

2012/0173901 A1   7/2012  Soliman et al.
2016/0113050 A1*  4/2016  Li ................... H04W 52/0209
                                                          370/329

FOREIGN PATENT DOCUMENTS

| | | |
|---|---|---|
| EP | 3241362 | 11/2017 |
| JP | 2010239570 | 10/2010 |
| WO | 2013086366 | 6/2013 |
| WO | 2013132289 A1 | 9/2013 |
| WO | 2016144405 | 9/2016 |

OTHER PUBLICATIONS

LG Electronics, "Discussion on resource allocation for D2D synchronization", 3GPP TSG RAN WG1 Meeting #76bis, R1-141356, Mar. 22, 2014, 4 Pages.
LG Electronics, "Discussion on D2D synchronization procedure", 3GPP TSG RAN WG1 Meeting #76bis, R1-141358, Mar. 22, 2014, 5 Pages.
Nokia et al., "Discussion on D2D synchronization procedure for communication and discovery", 3GPP TSG-RAN WG1 Meeting #76bis, R1-141542, Mar. 21, 2014, 5 Pages.
European Patent Office Application Serial No. 15769567.7, Search Report dated Nov. 21, 2017, 6 pages.
State Intellectual Property Office of the People's Republic of China Application Serial No. 201580015336.8, Office Action dated Nov. 2, 2018, 7 pages.
European Patent Office Application Serial No. 15769567.7, Search Report dated Mar. 4, 2019, 6 pages.

* cited by examiner

METHOD AND APPARATUS FOR PERFORMING CALL RELAY IN WIRELESS COMMUNICATION SYSTEM

CROSS-REFERENCE TO RELATED APPLICATIONS

This application is the National Stage filing under 35 U.S.C. 371 of International Application No. PCT/KR2015/003117, filed on Mar. 30, 2015, which claims the benefit of U.S. Provisional Application No. 61/971,545, filed on Mar. 28, 2014, the contents of which are all hereby incorporated by reference herein in their entirety.

BACKGROUND OF THE INVENTION

Field of the Invention

The present invention relates to wireless communications, and more particularly, to a method and apparatus for performing call relay in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As the number of user equipments (UEs) increases, demands for call relay have increased. For example, a 3GPP LTE UE wireless router can relay a call or session from a network to neighboring UEs, or from the neighboring UEs to the network. For another example, a smartphone can relay a call or session from the network to various kinds of smart devices, such as smart watch or smart glasses, around the smartphone, or from the smart devices to the network. In this case, seamless call relay among the network, relaying UE, and neighboring UEs are required.

SUMMARY OF THE INVENTION

The present invention provides a method and apparatus for performing call relay in a wireless communication system. The present invention provides a method for enhancing call relay for a 3rd generation partnership project (3GPP) long-term evolution (LTE) user equipment (UE) wireless router and wearable UEs.

In an aspect, a method for performing, by a relaying user equipment (UE), call relay in a wireless communication system is provided. The method includes configuring, by the relaying UE, a call order or priority among neighboring UEs, selecting, by the relaying UE, at least one neighboring UE among the neighboring UEs, and establishing, by the relaying UE, a call or a session between the selected neighboring UE and a caller UE.

In another aspect, a relaying user equipment (UE) is provided. The relaying UE includes a memory, a transceiver, and a processor coupled to the memory and the transceiver, and configured to configure a call order or priority among neighboring UEs, select one neighbor UE among the neighboring UEs, and establish a call or a session between the selected neighboring UE and a caller UE.

A relaying UE may relay call/session between one or more neighboring UE and a caller UE efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
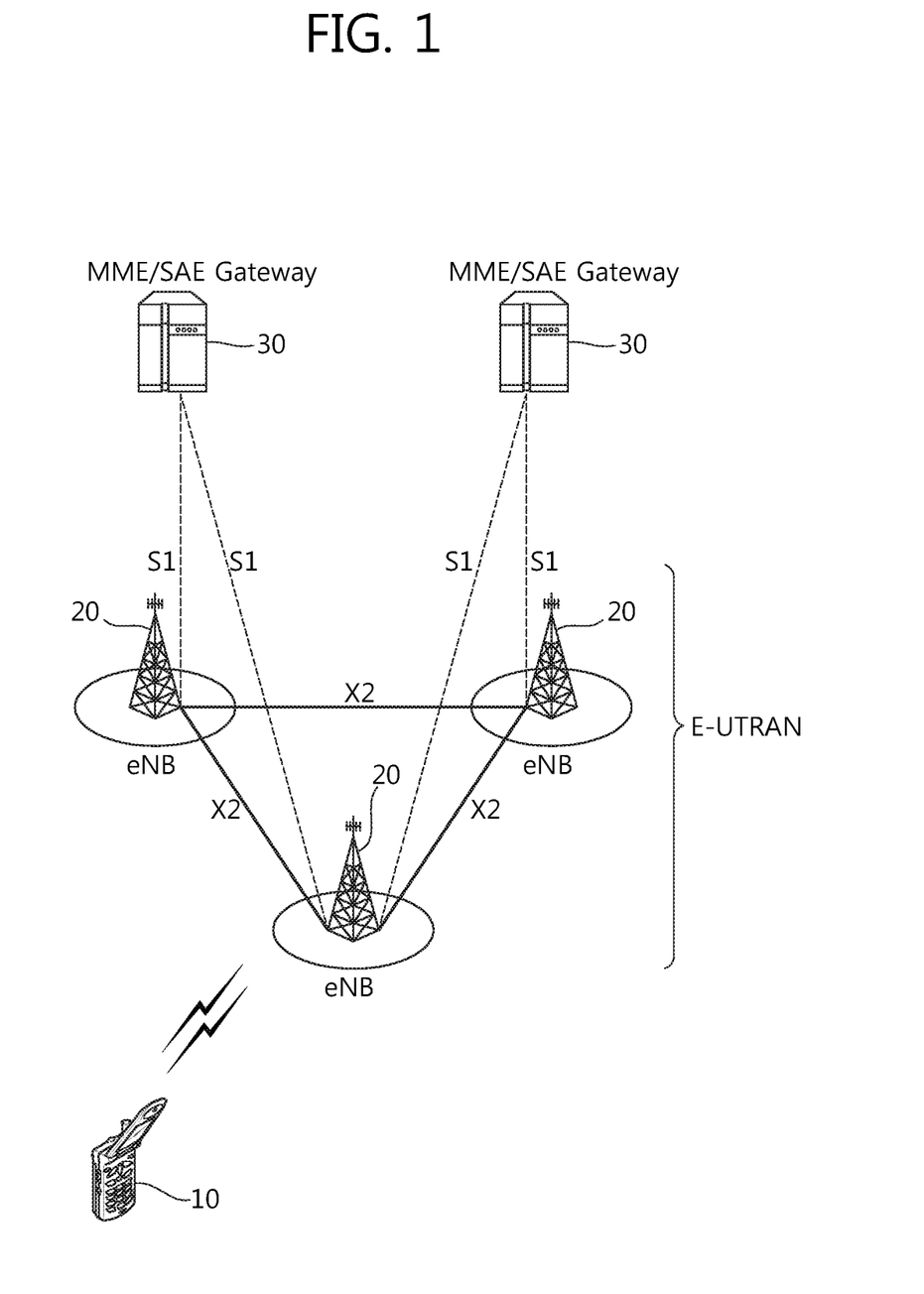
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
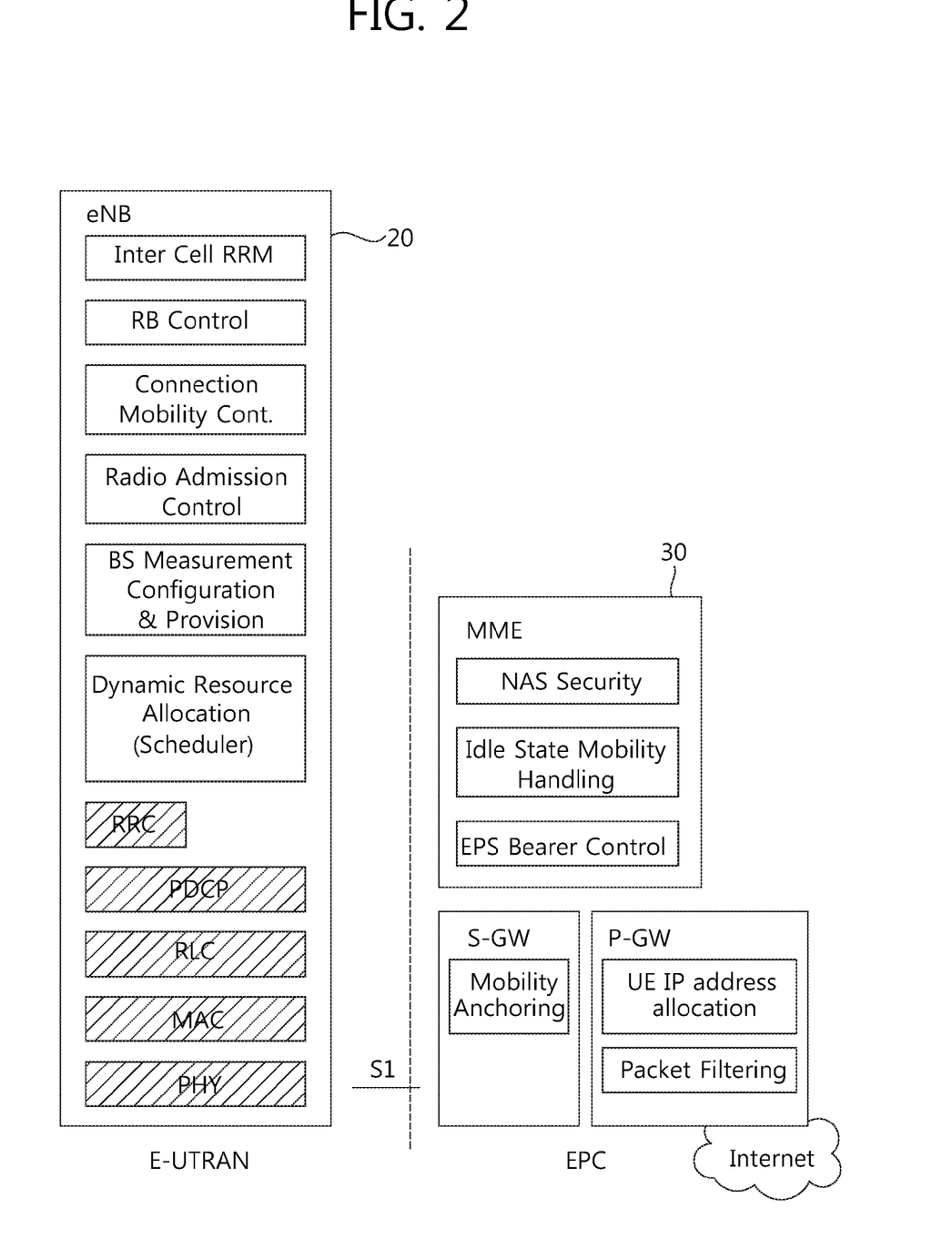
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
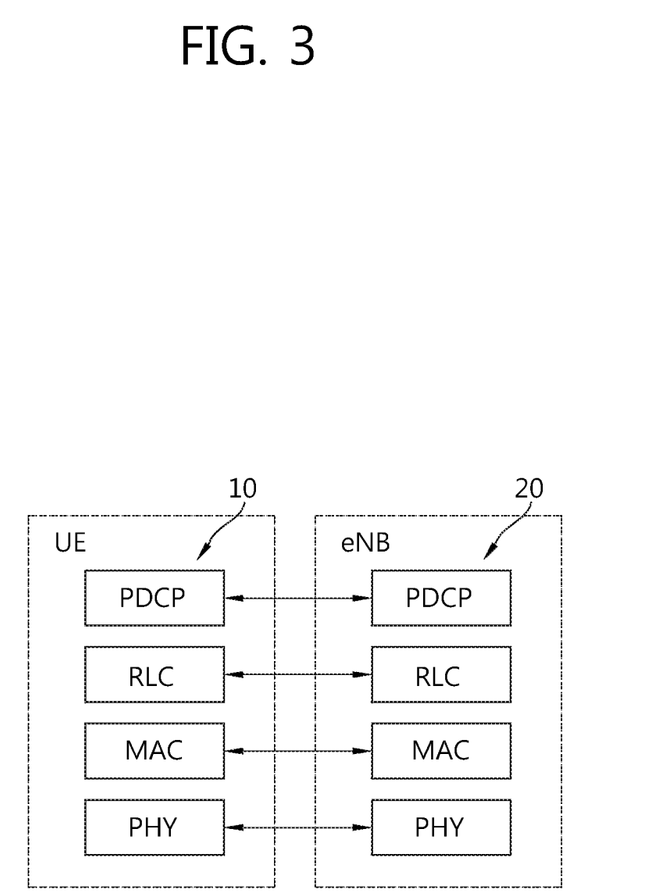
FIG. 3 shows a block diagram of a user plane protocol stack of an LTE system.
Figure 4:
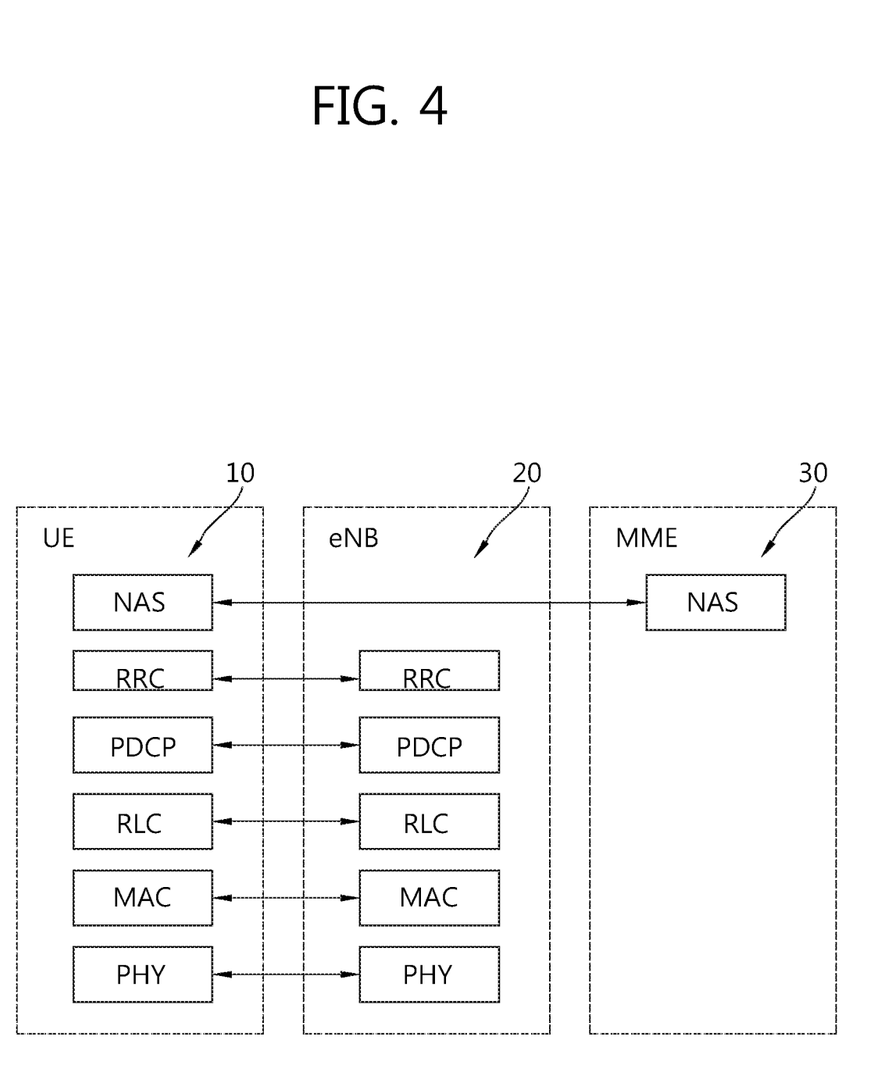
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
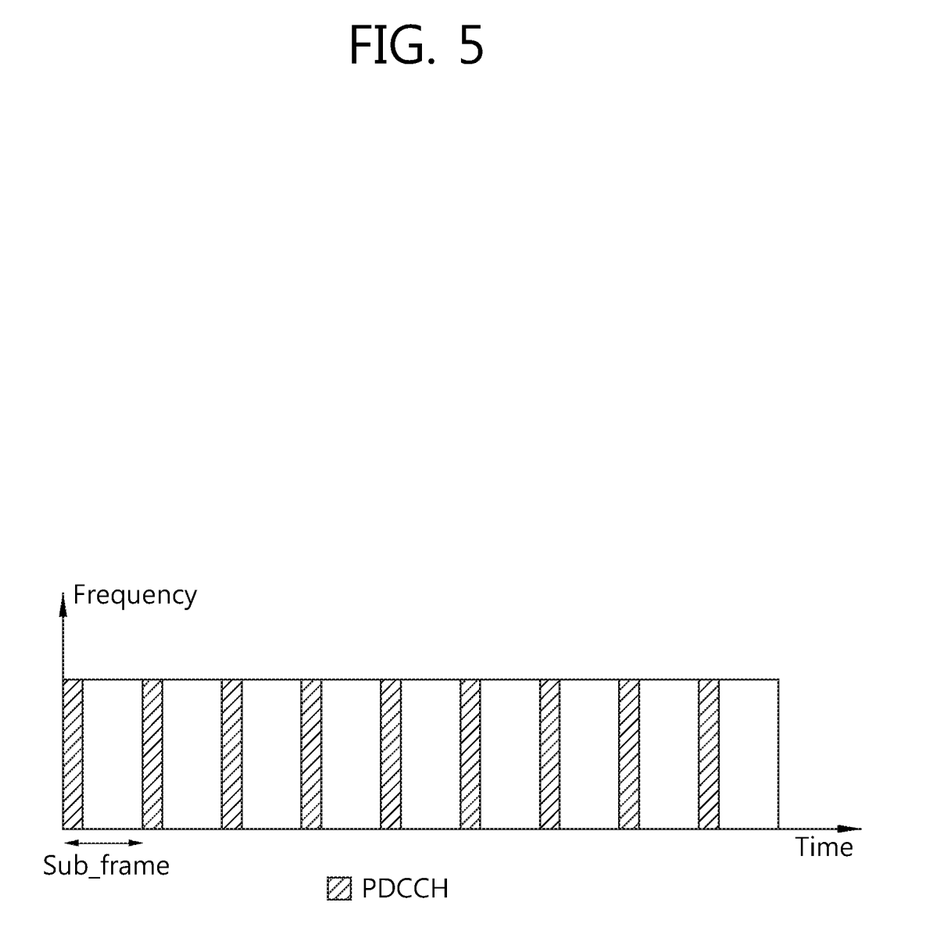
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Hereinafter, a method for performing call relay according to an embodiment of the present invention is described. A relaying UE (R-UE) is a UE that is capable of relaying a call or a session from the network to a neighboring UE and relaying a call or a session from a neighboring UE to the network. The R-UE may be also capable of relaying 3GPP signaling and user traffic between the network and the neighboring UE. The capability of the UE may be known to the network, e.g. as UE capability or device property when the R-UE attaches to the network. The R-UE may be a LTE UE wireless router or smartphone. A neighboring UE (N-UE) is a UE that is capable of communicating with the R-UE via wireless or wired connection (e.g. wireless local area network (WLAN), Bluetooth, Zigbee, or 3GPP LTE device-to-device (D2D)), while being connected to the network (E-UTRAN and EPC). The N-UE may operate as a normal UE in 3GPP LTE. The N-UE may be a smartphone or a wearable device, such as a smart watch/glasses/cap, connected to the R-UE. The capability of the N-UE may be known to the network, e.g. as UE capability or device property when the N-UE attaches to the network. A connected N-UE is an N-UE that is connected to the R-UE. This UE may or may not be connected to the network. A disconnected N-UE is an N-UE that is not connected to the R-UE. This UE may or may not be connected to the network. A callee UE is a UE that receives a call/session. A caller UE is a UE that requests/initiates a call/session.

Figure 6:
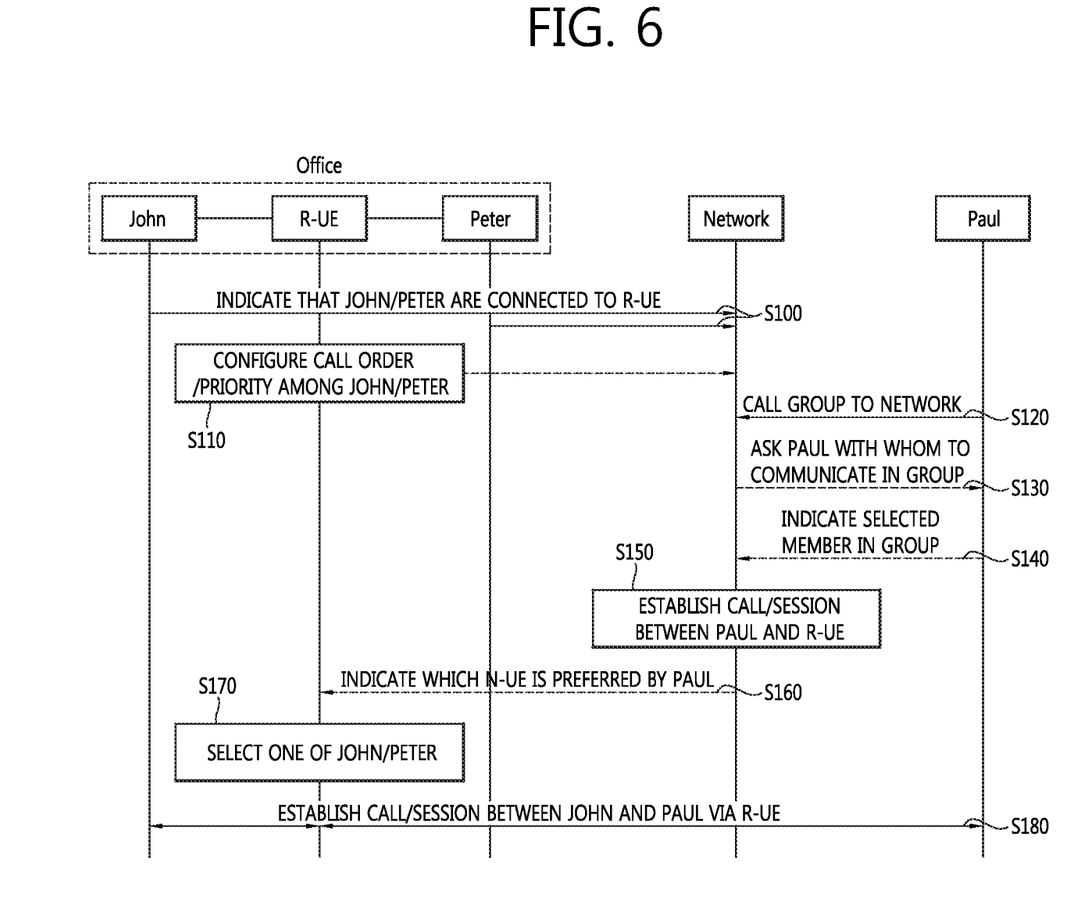
FIG. 6 shows an example of a method for performing a call relay according to an embodiment of the present invention.

FIG. 6 shows an example of a method for performing a call relay according to an embodiment of the present invention. FIG. 6 corresponds to use case for calling one or more N-UEs via the R-UE for LTE UE router. In embodiment of FIG. 6, it is assumed that John, Peter, and Mary work at the same office for the same group of the same company. John, Peter, and Mary have their own UEs (i.e. N-UEs). There is one R-UE, such as LTE wireless router, with a caller ID in the office. Further, it is assumed that Paul is working for another group of the same company. Paul calls the group of John, Peter, and Mary, so Paul wants one or more member of the group to take the call. It is assumed that John and Peter are present at the office at this moment, while Mary is not present at the office.

It is assumed that the R-UE (i.e. LTE wireless router) and N-UEs (i.e. John's UE, Peter's UE and Mary's UE) are attached to the network. Capability of the R-UE and the N-UE may be known to the network, e.g. as UE capability or device property when those UEs attach to the network. During the attach procedure, the R-UE may indicate to the network that the R-UE only relays voice/video call to the N-UE. That is, the R-UE may not receive a call whose destination is the R-UE (not N-UE), and/or may not request a call that is originated by the R-UE, not by the N-UE. Further, it is assumed that John's UE and Peter's UE are connected to the R-UE via either non-3GPP radio interface such as WLAN, Bluetooth or 3GPP radio interface such as 3GPP LTE D2D. The R-UE may verify whether or not John's UE and Peter' UE may be connected to the R-UE, e.g. by communicating with network or those N-UEs based on membership.

In step S100, John's UE and Peter's UE (i.e. N-UEs) informs the network that they are connected to the R-UE or they are in proximity of the R-UE. Both N-UEs may indicate information on the R-UE, e.g. R-UE identity, either directly to the network or indirectly to the network via the connection between the R-UE and the network. From this moment, the network may recognize which N-UEs are connected to the specific R-UE. If an N-UE becomes not in proximity of the R-UE, i.e. if an N-UE is disconnected with the R-UE, the R-UE may indicate release of the N-UE to the network with information on the N-UE, or the N-UE may indicate release of the R-UE to the network with information on the R-UE.

In step S110, the R-UE may configure a call order/priority with John's UE and Peter's UE among N-UEs (e.g. by communicating with both John's UE and Peter's UE). The R-UE or N-UE may inform the network of the configured call order/priority. The R-UE may configure the same call order/priority to John's UE and Peter's UE. Thus, upon receiving a call/session, the R-UE will establish a call/session with both John's UE and Peter's UE. Further, the R-UE is not included in the call order/priority.

In step S120, Paul's UE calls the group to the network, in order to communicate with one of members of the group. Paul's UE may call a specific member of the group, e.g. John's UE. In this case, the network may determine whether to establish this call on the direct connection between the network and John's UE, i.e. not via the R-UE, or to establish this call on the indirect connection via the R-UE. The described embodiment of FIG. 6 assumes that the network determines indirect connection for this call (in case that the specific member of the group is connected to the R-UE). Accordingly, the service flows will be continued, noting that the network selects John's UE as a callee, and so indicates John's UE to the R-UE in the next steps.

In step S130, the network may ask Paul's UE with whom Paul wants to communicate in the group. Then, Paul's UE may display a list of members of the group who are present at the office (i.e. John and Peter) based on connectivity/proximity with the R-UE, and optionally display a list of members of the group who are absent at the office (i.e. Mary). Paul's UE may select one or more member of the group as callee(s), and so, in step S140, Paul's UE may inform the network of the selected member(s) of the group. If the network verifies Paul's UE for communication with the group so that Paul's UE can acquire the list of members of the group, the network may perform this step with Paul's UE. Otherwise, the network may skip this step (or drop this call setup).

In step S150, the network establishes a call/session between Paul's UE and the R-UE, if there is a connected N-UE. In step S160, the network may indicate to the R-UE which N-UE is preferred for communication with Paul's UE. For example, if Paul's UE indicates John's UE to the network, the network may indicate John's UE to the R-UE as preferred N-UE by Paul's UE. If Paul's UE does not indicate anyone to the network, the network may select any connected N-UE based on the call order/priority, or the network may randomly select any connected N-UE. If there is no connected N-UE for the R-UE, the network may inform Paul's UE that no one is present at the office. Alternatively, if there is no connected N-UE for the R-UE, the network establishes a call/session between Paul's UE and the R-UE. Then, the R-UE may record a message such as voice/text/image that was sent from Paul's UE, and may inform Paul's UE that there is no one at the office. Or, the R-UE may request to the network so that the network tries to make a call between Paul's UE and Mary's UE, which is not present at the office.

In step S170, if the network indicates N-UE(s) to the R-UE, the R-UE selects the indicated N-UE(s). Otherwise, the R-UE may randomly select either John's UE or Peter's UE (if call order/priority was not set up) or based on the call order/priority. Accordingly, John's UE is selected. If the network indicates John's UE and Peter's UE, or if John's UE and Peter's UE have the same call order/priority, the R-UE may select both John's UE and Peter's UE, and so Paul's UE may make a group call with John's UE and Peter's UE.

In step S180, the R-UE establishes a call/session between Paul's UE and John's UE via the R-UE. If the R-UE fails to establish the call/session with John's UE, the R-UE may establish a cell/session with Peter's UE.

According to the embodiment of FIG. 6 described above, Paul can communicate with one or more members of the group, i.e. John at the office. Paul may talk with John via the established call, or Paul may share text/image with John via the established session.

Figure 7:
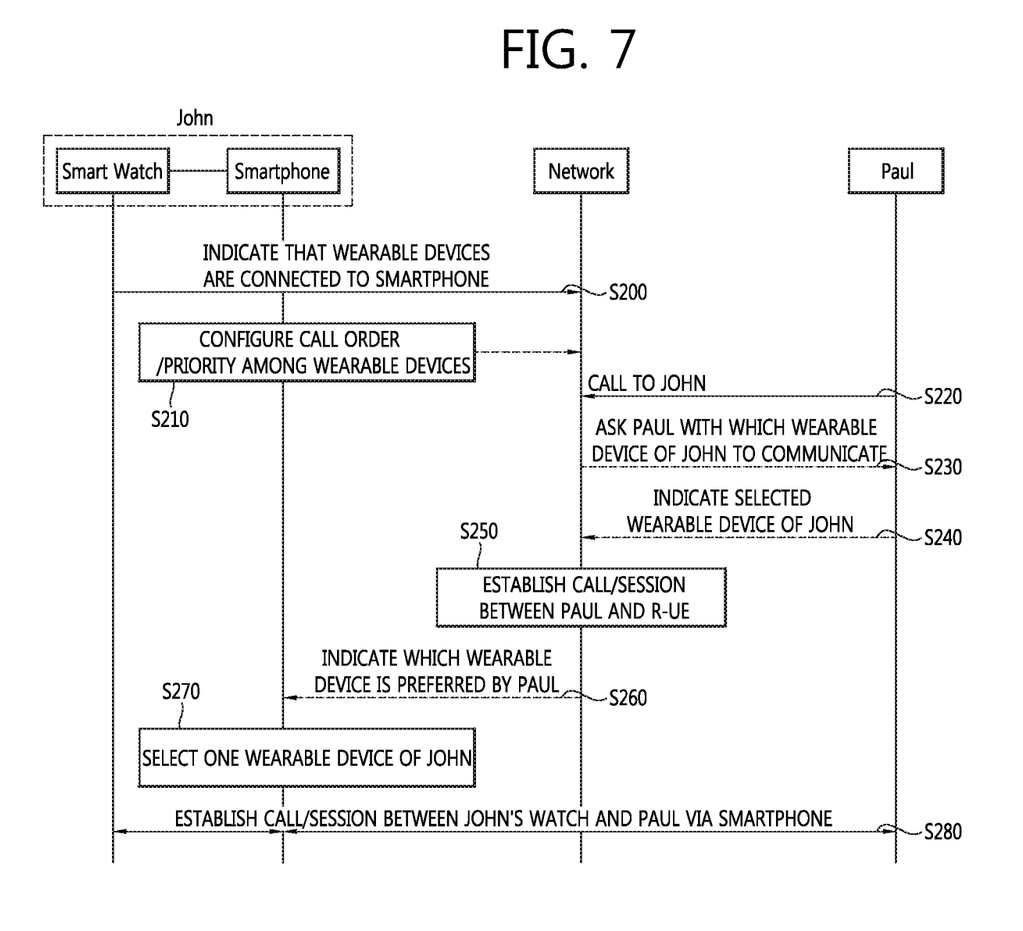
FIG. 7 shows another example of a method for performing a call relay according to an embodiment of the present invention.

FIG. 7 shows another example of a method for performing a call relay according to an embodiment of the present invention. FIG. 7 corresponds to use case for calling one or more N-UEs via the R-UE for wearable devices. In embodiment of FIG. 7, it is assumed that John owns one smartphone as the R-UE and three wearable devices, such as smart watch, smart glasses and smart cap, as N-UEs. Both smartphone and wearable devices have their own phone numbers (e.g. with their own universal subscriber identity modules (USIMs)). Paul's UE wants to call John's smart watch to communicate with John.

It is assumed that John's N-UEs are attached to the network. Capability of the R-UE and the N-UE may be known to the network, e.g. as UE capability or device property when those UEs attach to the network. During the attach procedure, the R-UE may indicate to the network that the R-UE can also receive a call whose destination is the R-UE (not N-UE), and/or may also request a call that is originated by the R-UE, not by the N-UE. Further, it is assumed that John's N-UEs are connected to the R-UE via either non-3GPP radio interface such as WLAN, Bluetooth or 3GPP radio interface such as 3GPP LTE D2D. The R-UE may verify whether or not each N-UE may be connected to the R-UE, e.g. by communicating with network or those N-UEs based on membership.

In step S200, John's N-UEs informs the network that they are connected to the R-UE or they are in proximity of the R-UE. John's N-UEs may indicate information on the R-UE, e.g. R-UE identity, either directly to the network or indirectly to the network via the connection between the R-UE and the network. From this moment, the network may recognize which N-UEs are connected to the specific R-UE. If an N-UE becomes not in proximity of the R-UE, i.e. if an N-UE is disconnected with the R-UE, the R-UE may indicate release of the N-UE to the network with information on the N-UE, or the N-UE may indicate release of the R-UE to the network with information on the R-UE.

In step S210, the R-UE may configure a call order/priority among N-UEs and R-UE. The R-UE may inform the network of the configured call order/priority. The R-UE may configure the same call order/priority to John's N-UEs. Thus, upon receiving a call/session, the R-UE will establish a call/session with both John's N-UEs. Further, the R-UE is included in the call order/priority.

In step S220, Paul's UE calls John to the network, in order to communicate with John. Paul's UE may call a specific N-UE of John, e.g. John's smart watch. In this case, the network may determine whether to establish this call on the direct connection between the network and the specific N-UE, i.e. not via the R-UE, or to establish this call on the indirect connection via the R-UE. The described embodiment of FIG. 7 assumes that the network determines indirect connection for this call (in case that the specific N-UE of John is connected to the R-UE). Accordingly, the service flows will be continued, noting that the network selects John's smart watch as a callee, and so indicates John's smart watch to the R-UE in the next steps.

In step S230, the network may ask Paul's UE with which N-UE of John wants to communicate. Then, Paul's UE may display the R-UE and a list of N-UEs of John which are connected to the R-UE, and optionally display a list of N-UEs of John which are not connected to the R-UE. Paul's may select one or more N-UE of John as callee(s), and so, in step S240, Paul's UE may inform the network of the selected N-UE of John. If the network verifies Paul's UE for communication with John so that Paul's UE can acquire the list of N-UEs of John, the network may perform this step with Paul's UE. Otherwise, the network may skip this step (or drop this call setup).

In step S250, the network establishes a call/session between Paul's UE and the R-UE. In step S260, the network may indicate to the R-UE which N-UE is preferred for communication with Paul's UE. For example, if Paul's UE indicates John's smart watch to the network, the network may indicate John's smart watch to the R-UE as preferred N-UE by Paul's UE. If Paul's UE does not indicate anyone to the network, the network may select the R-UE by default, or any connected N-UE based on the call order/priority. Or, the network may randomly select John's UE among the R-UE and connected N-UEs. If the preferred N-UE is not connected to the R-UE, the network may inform Paul's UE that John's R-UE will receive this call, or the network may establish a call/session directly with the preferred N-UE, not via the R-UE. John may configure how the network should react for this case by negotiating with the network. If the preferred N-UE does not respond to the network for this call/session establishment, the network may establish a call/session between Paul's UE and the R-UE. Then, the R-UE may record a message such as voice/text/image that was sent from Paul's UE, and then, when the R-UE is connected to the preferred N-UE, may forward the message to the preferred N-UE.

In step S270, if the network indicates N-UE(s) to the R-UE, the R-UE selects the indicated N-UE(s). Otherwise, the R-UE may randomly select the R-UE itself by default (if call order/priority was not set up) or a specific N-UE based on the call order/priority. Accordingly, John's smart watch is selected. If the network indicates John's smart watch and John's smart glasses, or if John's smart watch and John's smart glasses have the same call order/priority, the R-UE may select both John's smart watch and John's smart glasses, and so Paul's UE may make a group call/session with both John's smart watch and John's smart glasses.

In step S280, the R-UE establishes a call/session between Paul's UE and John's smart watch via the R-UE. If the R-UE fails to establish the call/session with John's smart watch, the R-UE may establish a cell/session with the R-UE.

According to the embodiment of FIG. 7 described above, Paul can talk/chat with John via John's smart watch. Further, Paul can share text with John's smart watch via the established session.

For the embodiment of the present invention described above, the R-UE shall be able to inform the network about a list of N-UEs that are being connected to the R-UE or in proximity of the R-UE. The N-UE shall be able to indicate information on direct connection between the N-UE and R-UE to the network, through the connection between the R-UE and the network. The network shall be able to inform a caller UE about the list of N-UEs that are being connected to the callee R-UE or in proximity of the callee R-UE. The caller UE shall be able to select one or more callee N-UE after calling the callee R-UE. The R-UE shall be able to establish a call/session between the network and N-UE(s) via the R-UE by either preference of the caller UE or call order/priority configured by the R-UE and N-UE. The network shall be able to decide which bearer between the specific N-UE and the network is directly established via E-UTRAN, i.e. not via the R-UE, and which bearer between the N-UE and the network is established indirectly via the R-UE.

Figure 8:
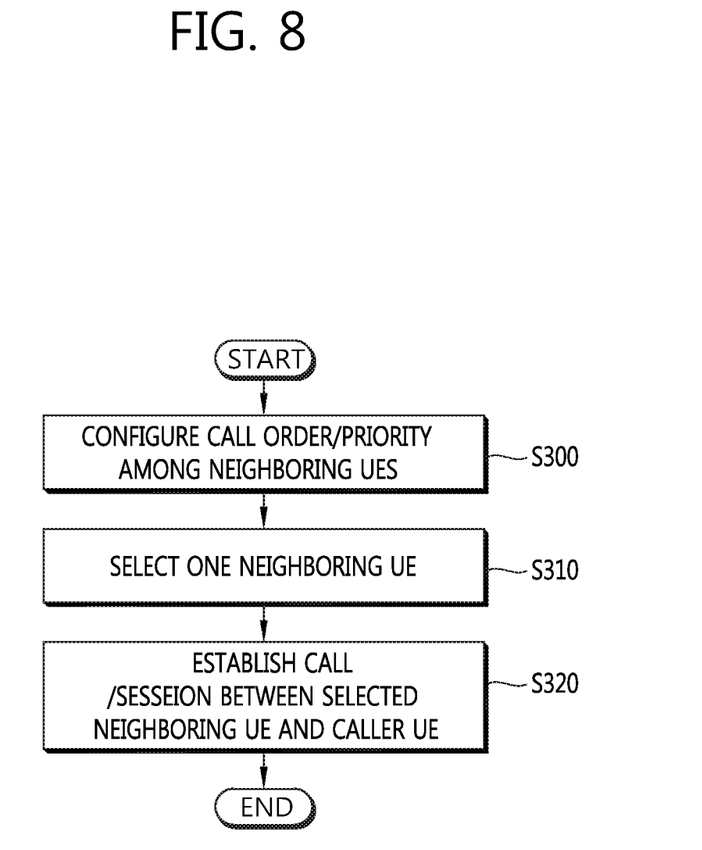
FIG. 8 shows another example of a method for performing a call relay according to an embodiment of the present invention.

FIG. 8 shows another example of a method for performing a call relay according to an embodiment of the present invention. In step S300, the relaying UE configures a call order or priority among neighboring UEs. The relaying UE may transmit capabilities of the relaying UE and the neighboring UEs to the network. The relaying UE may be a LTE UE router, and the neighboring UEs may be normal UEs. In this case, the relaying UE may indicate that the relaying UE only performs relaying to the neighboring UEs to the network. Alternatively, the relaying UE may be a smartphone, and the neighboring UEs may be wearable devices connected to the relaying UE. In this case, the relaying UE may indicate that the relaying UE can receive a call and request a call to a network. The configured call order or priority may be transmitted to the network. The call order or priority may include or not include the relaying UE.

Further, the neighboring UEs may be connected to the relaying UE or in proximity of the relaying UE. Further, the relaying UE may verify whether the neighboring UE can be connected to the relaying UE. Further, the relaying UE may indicate release of the neighboring UEs with information on the neighboring UEs to a network, if the neighboring UEs are not connected to the relaying UE or not in proximity of the relaying UE.

In step S310, the relaying UE selects at least one neighboring UE among the neighboring UEs. The relaying UE may receive information on preferred neighboring UE by the caller UE, and the at least one neighboring UE may be selected based on the received information on preferred neighboring UE. Or, the at least one neighboring UE may be selected based on the configured call order or priority. Or, the at least one neighboring UE may be selected randomly among the neighboring UEs.

In step S320, the relaying UE establishes a call or a session between the selected neighboring UE and a caller UE.

Figure 9:
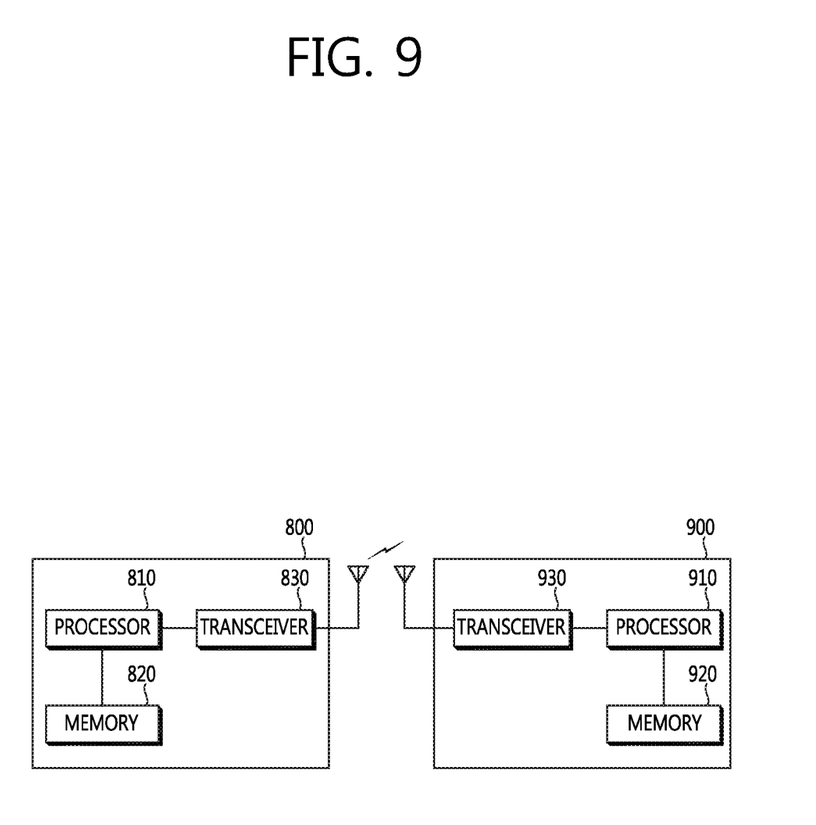
FIG. 9 shows a wireless communication system to implement an embodiment of the present invention.

FIG. 9 shows a wireless communication system to implement an embodiment of the present invention.

A first UE 800 may include a processor 810, a memory 820 and a transceiver 830. A first UE may be the R-UE described above. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A second UE 900 may include a processor 910, a memory 920 and a transceiver 930. A second UE may be the N-UE described above. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for a relaying user equipment (UE) in a wireless communication system, the method comprising:
    transmitting, by the relaying UE, information informing that the relaying UE is connected to at least one of multiple neighboring UEs to a base station (BS);
    reporting, by the relaying UE, a list of the at least one of the multiple neighboring UEs which are connected to the relaying UE to the BS; and
    establishing, by the relaying UE, a call between a selected neighboring UE and a caller UE, when the selected neighboring UE which is selected by the caller UE is included in the list,
    wherein the relaying UE is a 3rd generation partnership project (3GPP) long-term evolution (LTE) UE router, and
    wherein the neighboring UEs are connected to the relaying UE or in proximity of the relaying UE via a non-3GPP radio interface.

2. The method of claim 1, further comprising:
    indicating, by the relaying UE, that the relaying UE only performs relaying to the neighboring UEs to a network.

3. The method of claim 1,
    wherein the relaying UE is a smartphone, and
    wherein the neighboring UEs are wearable devices connected to the relaying UE.

4. The method of claim 3, further comprising indicating, by the relaying UE, that the relaying UE can receive a call and request a call to a network.

5. The method of claim 1, further comprising verifying, by the relaying UE, whether the neighboring UE can be connected to the relaying UE.

6. The method of claim 1, further comprising transmitting, by the relaying UE, the configured call order or priority to a network.

7. The method of claim 1, wherein the call order or priority includes or does not include the relaying UE.

8. The method of claim 1, further comprising indicating, by the relaying UE, release of the neighboring UEs with information on the neighboring UEs to a network, if the neighboring UEs are not connected to the relaying UE or not in proximity of the relaying UE.

9. A relaying user equipment (UE) comprising:
    a memory;
    a transceiver; and
    a processor coupled to the memory and the transceiver, and configured to:
        control the transceiver to transmit information informing that the relaying UE is connected to at least one of multiple neighboring UEs to a base station (BS);
        report a list of the at least one of the multiple neighboring UEs which are connected to the relaying UE to the BS; and
        establish a call between a selected neighboring UE and a caller UE, when the selected neighboring UE which is selected by the caller UE is included in the list,
    wherein the relaying UE is a 3rd generation partnership project (3GPP) long-term evolution (LTE) UE router, and
    wherein the neighboring UEs are connected to the relaying UE or in proximity of the relaying UE via a non-3GPP radio interface.

* * * * *